No. 844,038. PATENTED FEB. 12, 1907.
R. H. NICHOLSON.
BRAKE OPERATING MECHANISM.
APPLICATION FILED AUG. 3, 1906.
2 SHEETS—SHEET 1.
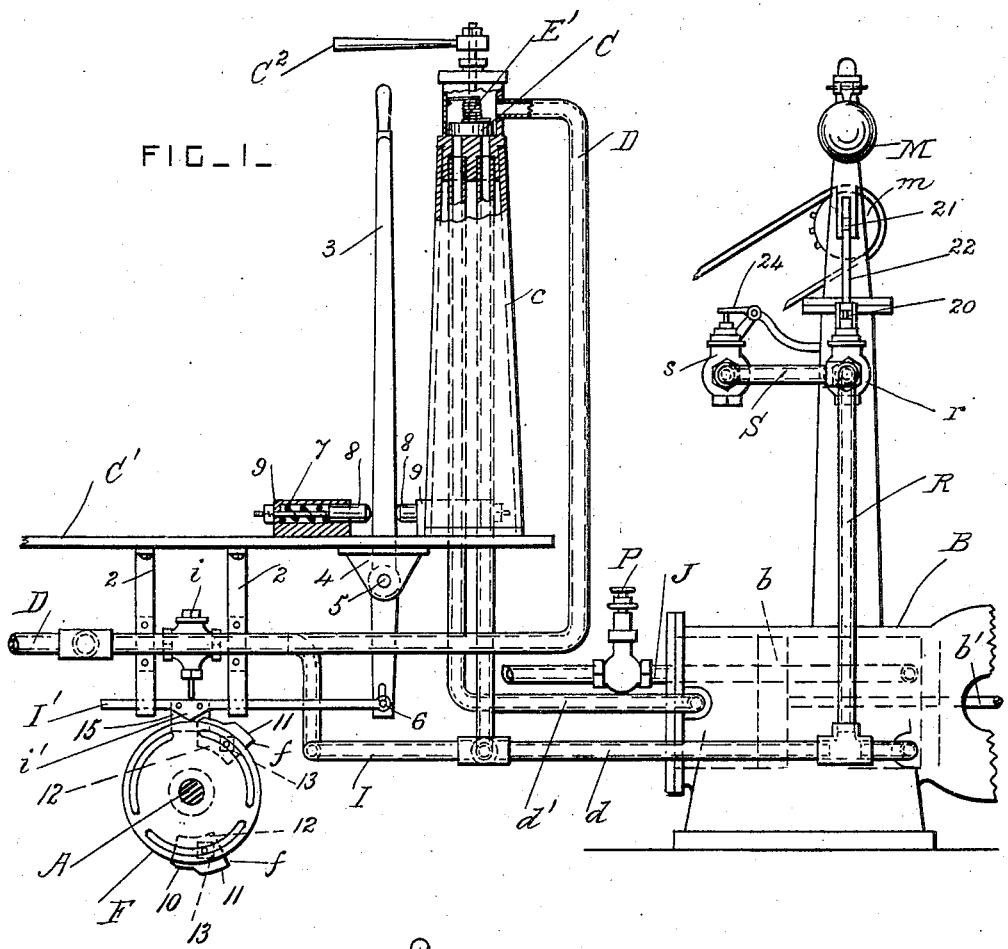
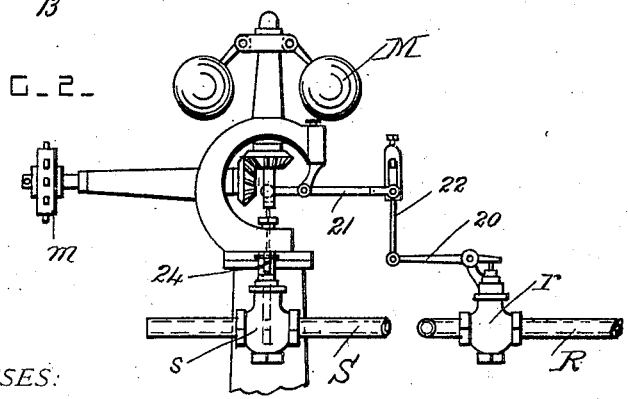
WITNESSES: INVENTOR
S. E. Tomlinson Robert H. Nicholson
Jacob Schaefer BY Herbert W. T. Jenner
Attorney No. 844,038. PATENTED FEB. 12, 1907.
R. H. NICHOLSON.
BRAKE OPERATING MECHANISM.
APPLICATION FILED AUG. 3, 1906.

2 SHEETS—SHEET 2.

WITNESSES:
S. E. Tomlinson
Jacob Schaefer

INVENTOR
Robert H. Nicholson.
BY
Herbert W. Jenner.
Attorney

UNITED STATES PATENT OFFICE.

ROBERT HARLE NICHOLSON, OF WILKES-BARRE, PENNSYLVANIA.

BRAKE-OPERATING MECHANISM.

No. 844,038. Specification of Letters Patent. Patented Feb. 12, 1907.

Application filed August 3, 1906. Serial No. 329,037.

*To all whom it may concern:*

Be it known that I, ROBERT HARLE NICHOLSON, a citizen of the United States, residing at Wilkes-Barre, in the county of Luzerne and State of Pennsylvania, have invented certain new and useful Improvements in Brake-Operating Mechanism; and I do hereby declare the following to be a full, clear, and exact description of the invention, such as will enable others skilled in the art to which it appertains to make and use the same.

This invention relates to mechanism for regulating the supply of steam or other fluid to the brake-cylinders of the brakes of winding or other similar engines used in connection with mines; and it consists in the novel construction and combination of the parts hereinafter fully described and claimed.

Figure 3:
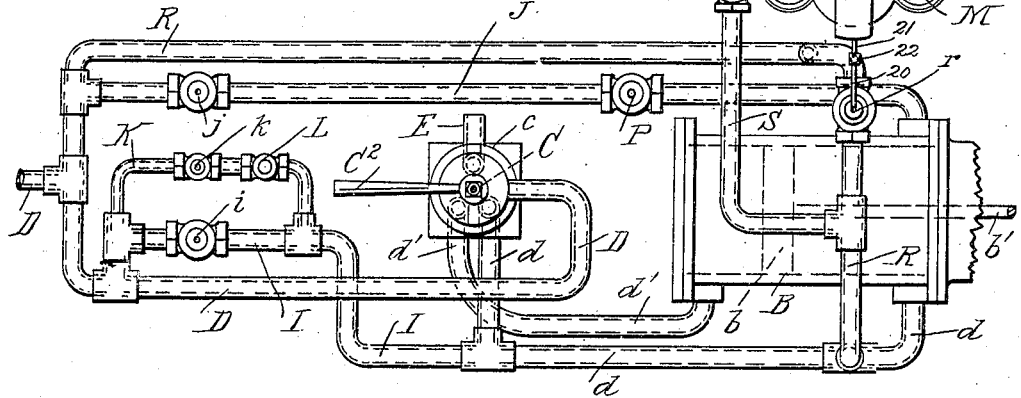
Figure 4:
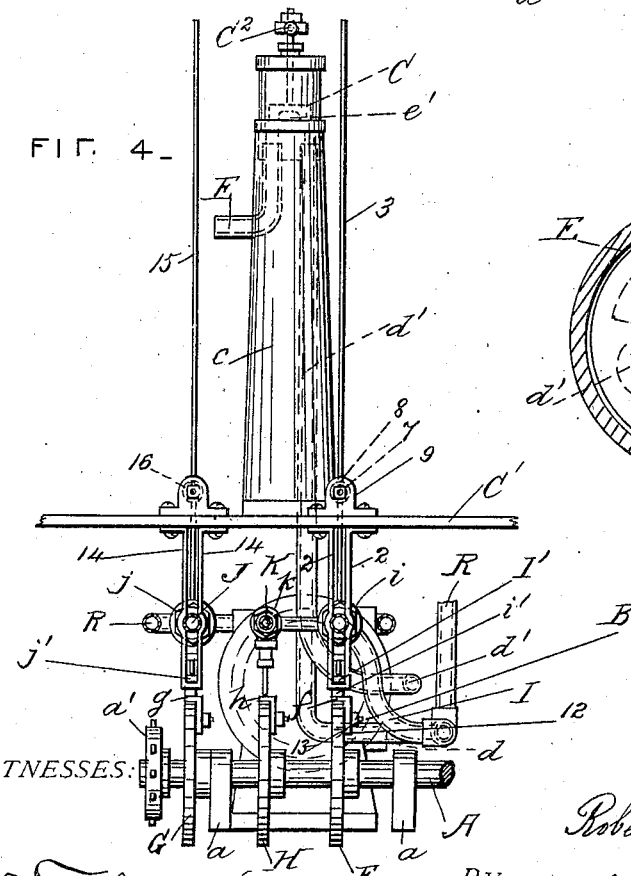
Figure 5:
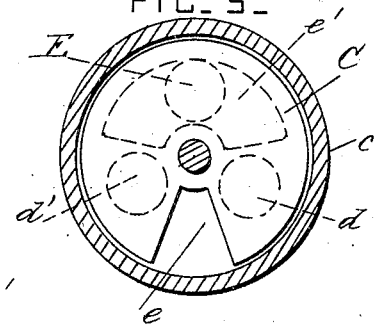

In the drawings, Figure 1 is a side view of the mechanism. Fig. 2 is a side view of the centrifugal governor turned one-quarter around from the position shown in Fig. 1. Fig. 3 is a plan view of the brake-cylinder and steam-pipes. Fig. 4 is an end view of the mechanism shown in Fig. 1. Fig. 5 is a detail plan view of the hand-valve.

A is a shaft mounted in any suitable bearings $a$, and provided with a wheel $a'$ for revolving it. This shaft A is revolved from the crank-shaft of any approved winding or hauling engine, such as commonly used for the purpose of raising and lowering the cages in mines for the men or coal. The said shaft A is preferably connected with the said winding-engine by intermediate driving devices which reduce the speed, such as shown and described in the patent issued to me on September 19, 1905. B is a steam-cylinder provided with a piston $b$ and a piston-rod $b'$ for actuating the brake mechanism of the said winding-engine, and thereby bringing the cage to a standstill at the top and bottom of the mine-shaft. The brake mechanism is not shown in the drawings, as it is of any approved construction used in connection with winding-engines.

C is the hand-valve, operated by the engineer and supported by a pedestal $c$, arranged on the engineer's platform C'. D is the main steam-supply pipe, connected to the casing of the said valve. Two pipes $d$ and $d'$ are also connected to the said valve-casing and to the respective ends of the steam-cylinder B. E is the exhaust-pipe, also connected to the said valve-casing. The valve is preferably of the disk type, and it is provided with a steam-supply opening or gap $e$ for placing the pipes $d$ and $d'$ in connection with the main pipe D alternately. The valve C is also provided with an exhaust-cavity $e'$, by means of which the pipes $d$ and $d'$ are placed in communication alternately with the exhaust-pipe E.

In carrying out this invention the valve C is provided with a spring E', which normally holds the valve in the position shown in Fig. 5, in which the pipes $d$ and $d'$ are out of communication with the exhaust-pipe E and the steam-pipe D.

$C^2$ is the handle for operating the valve C, secured upon its stem, which projects through a stuffing-box on its casing.

The devices for working the brake mechanism automatically are operated from the shaft A. Three disks F, G, and H are secured on the shaft A, and these disks are provided with pairs of tappets $f$, $g$, and $h$, respectively. These tappets are adjustable on the said disks, so that their action can be accurately timed with respect to the position of each other and the position of the mine-cage.

I is a steam-supply pipe arranged between the pipe D and the pipe $d$, which supplies steam to the cylinder B, so as to apply the brake. A valve $i$ is arranged in the pipe I, and I' is a tappet-bar arranged under the stem of the valve $i$ and provided with a projection $i'$ in the path of the tappets $f$. The tappet-bar I' is arranged horizontally in guides 2, secured to the platform C', and is slidable vertically and horizontally in the said guides. An operating-lever 3 is pivoted to a bracket 4 by a pin 5. The bracket 4 is secured to the under side of the platform, and the upper part of the lever projects upwardly through a slot in the platform. The lower end of the lever 3 is pivoted to the tappet-bar I' by a pin 6. Springs 7 are provided for holding the lever 3 in its middle position, and these springs preferably operate on pistons 8, which slide in blocks 9 secured to the platform, and which pistons bear against the said lever. The projection $i'$ is preferably V-shaped or inclined, and each tappet $f$ has steps 10 and 11 of different height, the end portions of which also are inclined. Each tappet $f$ also has a side plate 12 opposite the face of the disk, and 13 is a stop which projects from the face of the disk. The stop 13 may conveniently be the head of the screw or bolt by means of which the tappet is secured to the disk. The tappet-bar I' has a plate or projection 15 on one side of the projection i', which works against the plate 12. When the projection i' is raised by the tappet f, the stop 13 passes under the plate or projection 15.

J is a steam-supply pipe arranged between the pipe D and the same end of the cylinder B as the pipe d. This pipe J supplies steam to set the brake in a similar manner to the pipe I; but in order to set the brake more slowly the pipe J is provided with an adjustable pressure-reducing valve P of any approved construction. A valve j is arranged in the pipe J, and J' is a tappet-bar arranged under the stem of the valve j and in the path of the tappets q. The tappet-bar J' works in guides 14 and is provided with a pivoted operating-lever 15, having springs 16 for normally holding it in its middle position. The lever 15 and its accessories are similar to those previously described in connection with the valve i, and they have similar functions.

K is a by-pass pipe connected to the pipe I upon opposite sides of the valve i. This pipe K is provided with a valve k and an adjustable pressure-reducing valve L. The valve k is operated by the tappets h, which engage direct with its valve-stem without the intervention of any tappet-bar.

M is a centrifugal speed-governor of any approved construction mounted on a suitable stand and provided with a driving-wheel m. This governor is driven by the winding-engine by intermediate driving mechanism. (Not shown in the drawings.)

R is a pipe arranged between the pipes D and d and provided with an admission-valve r. This valve is normally closed, and its valve-stem is operated from the central spindle of the governor by means of pivoted levers 20 and 21 and a connecting-rod 22 or any other approved mechanism, so that when the governor-balls are raised by reason of the winding-engine attaining too great a speed the valve r is opened and steam is admitted through the pipe R to the brake-cylinder B to apply the brake, and thereby check the speed of the winding-engine. A pipe S is also connected to the pipe R, and it is provided with an outlet-valve s. The valve s is normally closed, and it is connected with the central spindle of the governor by means of a pivoted lever 24. When the brake has been applied by the action of the governor and the speed of the winding-engine and of the governor has decreased so that the governor-balls fall below their normal position, the valve s is opened automatically to reduce the steam-pressure which applies the brake, and the winding-engine then returns to its normal speed.

The valve i is operated automatically by the tappets when the mine-cage arrives at the top and bottom of its shaft. The lower steps on the tappets cause the valve to open a little at first, so as to apply the brake lightly before the cage reaches the top or bottom of the shaft, and the higher steps hold the valve wide open when the cage is raised or lowered to its full extent. The engineer then sides the tappet-bar by means of the lever, so that the projection is moved off the steps. When the projection i' is thus slid off the steps, the plate 15 drops into the path of the stop 13, and the said stop prevents the bar I' from being moved accidentally in the reverse direction. The engineer then reverses the winding-engine in the usual manner. The valve j is operated in a similar manner to the valve i by means of its own tappets and hand-lever, hereinbefore described. The valve j can be arranged to come into operation in advance of the valve i, so that the speed of the winding-engine can be checked gradually. The by-pass valve can also be arranged to act slightly in advance of the valve i, so as to fill the pipes and cylinder with high-pressure steam and enable the valve i to apply the full pressure of the steam at the exact moment required.

The engineer has at all times a full command of the supply and exhaust of steam to and from the brake-cylinder by means of the hand-valve C, and the various tappets can be adjusted so as to work or to be thrown out of action from time to time, according to the varying requirements of the mine.

What I claim is—

1. The combination, with a brake-cylinder provided with a steam-supply pipe, of an inlet-valve arranged in the said pipe, driving mechanism provided with a disk, and a tappet secured to the said disk and provided with steps of different height for opening the said valve step by step.

2. The combination, with a brake-cylinder provided with an inlet-valve, of driving mechanism provided with a tappet, a longitudinally-slidable tappet-bar arranged intermediate of the said tappet and valve and provided with a projection, and means for sliding the said bar longitudinally to move its said projection into and out of the path of the said tappet.

3. The combination, with a brake-cylinder provided with a steam-supply pipe, of an inlet-valve arranged in the said pipe, driving mechanism provided with a disk, a tappet secured to the said disk, a tappet-bar arranged between the said disk and valve and provided with a projection for the said tappet to engage with, a hand-lever for sliding the said tappet-bar, and means for normally holding the said tappet-bar stationary.

4. The combination, with a brake-cylinder provided with a steam-supply pipe, of an inlet-valve arranged in the said pipe, driving mechanism provided with a disk, a tappet and a stop secured to the said disk, and a movable tappet-bar arranged between the said disk and valve and provided with a projection for the said tappet to engage with and a second projection which is engaged by the said stop when the said first projection is moved out of engagement with the said tappet.

5. The combination, with a brake-cylinder provided with a steam-supply pipe, of an inlet-valve arranged in the said pipe, a by-pass pipe connected to the said supply-pipe on opposite sides of the said valve and also provided with an inlet-valve, driving mechanism provided with two disks, and tappets secured to the two said disks and arranged to open the two said valves respectively.

6. The combination, with a brake-cylinder provided with two steam-supply pipes, of inlet-valves arranged in the said pipes, a pressure-reducing valve arranged in one of the said pipes, driving mechanism provided with two disks, and tappets secured to the two said disks and arranged to open the two said inlet-valves respectively.

In testimony whereof I have affixed my signature in the presence of two witnesses.

ROBERT HARLE NICHOLSON.

Witnesses:
G. W. REYNOLDS,
H. E. CHASE.